United States Patent

[11] 3,538,841

[72] Inventor Vasilie Nikolic
  Bucharest, Rumania
[21] Appl. No. 652,235
[22] Filed July 10, 1967
[45] Patented Nov. 10, 1970
[73] Assignee Ministerul Industriei Alimentare
  Bucharestm Rumania,
  a corporation of Rumania

[54] DEVICE FOR THE DOSAGE AND THE
  INTRODUCTION OF BLACK CUMMIN SEEDS
  (NIGERIA SATIVA) INTO TELEMEA CHEESE
  3 Claims, 1 Drawing Fig.
[52] U.S. Cl. .................................................... 99/243,
  99/115
[51] Int. Cl. ...................................................... A23c 19/10
[50] Field of Search ........................................ 99/243,
  115, 116, 117, 162; 31/46

[56] References Cited
UNITED STATES PATENTS
3,103,871 9/1963 Czulak et al. ................. 99/243

Primary Examiner—William I. Price
Assistant Examiner—Arthur O. Henderson
Attorney—Karl F. Ross ABSTRACT: Device for treating cheese with grains of a condiment seed, in which the cheese body or curd is passed across the opening of a tube connected with a vessel under air pressure and through which an air stream is directed at the cheese. Individual seeds are successively positioned ahead of the tube and are carried by the air stream therethrough to penetrate the curd.

Patented Nov. 10, 1970     3,538,841
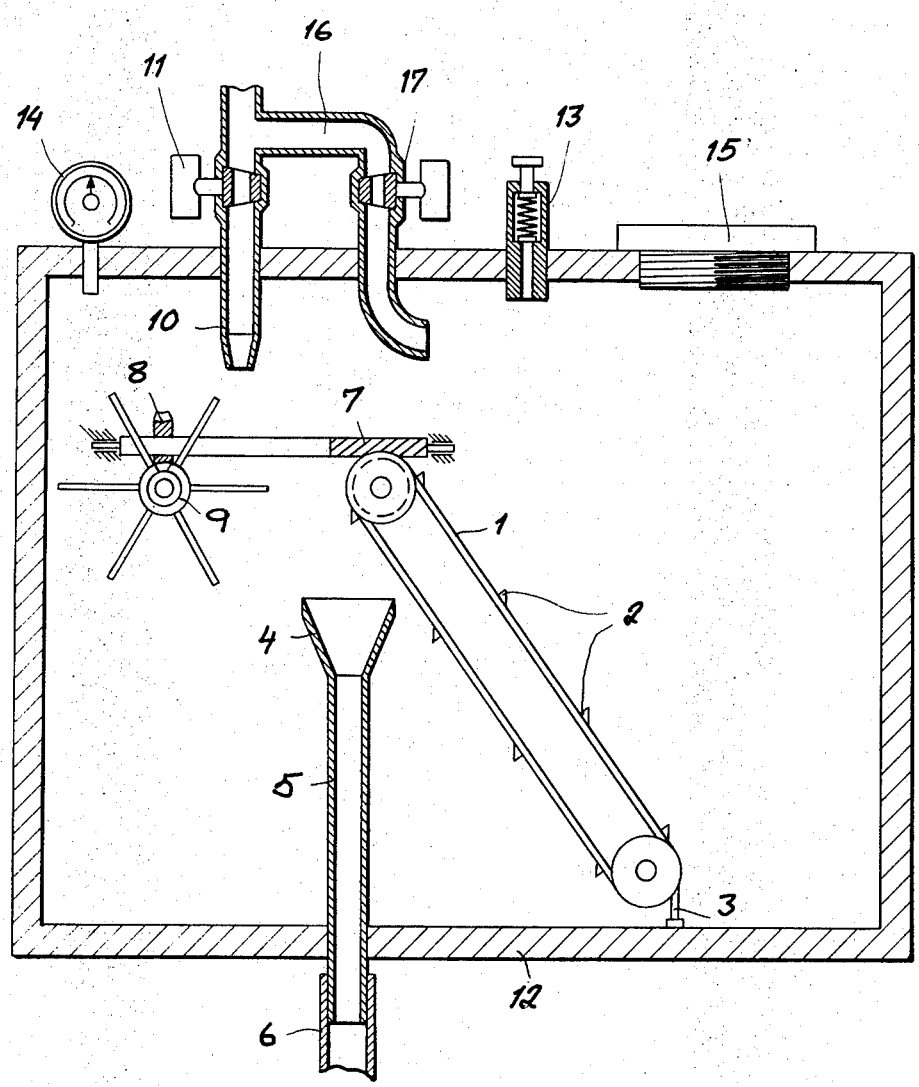
Vasilie Nikolic
INVENTOR.
BY
Karl F. Ross
Attorney

DEVICE FOR THE DOSAGE AND THE INTRODUCTION OF BLACK CUMMIN SEEDS (NIGERIA SATIVA) INTO TELEMEA CHEESE

The invention relates to a process and a device for the dosage and the introduction, by compressed air, of black cummin seeds into a cheese body in the continuous processing of Telemea cheese.

There are known processes for strewing or sprinkling black cummin seeds in Telemea cheese, in its discontinuous processing, the most usual technique being the hand-strewing of the seeds onto the cheese.

There are also known processes of strewing or sprinkling on cheese or other similar products, in which the matter to be strewn or sprinkled is projected in a single pass upon the objects to be strewn or sprinkled, these objects being brought by a conveyer to a unit with two spray heads to a device operating with compressed air, acting upon the matter to be sprayed, enclosed in a receptacle, from which the solid matter is sprayed through an orifice upon the cheese. The disadvantage of the known processes and devices consists in that the sprayed or sprinkled matter remains on the surface of the cheese in an nonuniform distribution.

The present invention removes the disadvantage of the known processes: by spraying single grains of black cummin seeds in Telemea cheese; by the dosage of the necessary quantity of seeds and by maintaining the initial stratification of the cheese-curd, the black cummin seed being introduced into the depths of the layers by means of a bucket conveyer, the volume of the buckets being equal to that of a seed grain, the bucket conveyer being enclosed in a compressed-air receptacle, from which the grains are successively, forcedly projected through a tube, into the curd, in a sequence which is a function of the feeding speed of the conveyer; the process can be realized with a device, consisting of a bucket conveyer, each of the buckets taking up a single grain, which is then fed to an elongated funnel. The bucket conveyer is driven by a worm gear, mounted on the same shaft supporting another worm gear, provided with a blade wheel and driven by an air jet injected through a tube into the receptacle of the device.

In the following there is given an example of the realization of the invention, with reference to the sole FIG. of the drawing which represents diagrammatically in vertical section an apparatus for carrying out the invention.

The device for the dosage and the introduction of black cummin seeds into Telemea cheese, processed in a continuous flow, is made up of a conveyer 1; inclined from the horizontal position, and provided at equal distances with buckets 2, each taking up a single black cummin seed, the volume of the bucket being equal to that of a seed grain, the access of the seeds to the gearing of the conveyer being prevented by a brush 3 of hair or plastic threads. Each grain, upon reaching the top of the conveyer is tipped over into a funnel or mouth 4, situated under the upper tilting or reversing point of the buckets, the funnel being extended with a metallic tube 5 and a flexible rubber or plastic tube 6, which allows the frictionless passage of a black cummin seed grain. The conveyer belt is driven by a worm gear 7, mounted on the same shaft, on which is mounted another worm gear 8, driven by a blade wheel 9. This wheel being driven by an air jet introduced through a tube 10, provided with a flow-control valve 11, the whole unit being enclosed in a receptacle 12, with transparent walls, provided at its upper part with openings for a safety valve 13, for a manometer 14, for a threaded cover 15, for introduction of the black cummin seeds and for a branch 16 of the tube 10, provided with a control valve 17 for regulation of the air pressure in the receptacle. On the whole width of the conveyer belt there may be mounted several rows of buckets 2, in such manner that in the position of each longitudinal row of buckets (in the advancing sense of the conveyer belt) there is provided a funnel 4, which receives the black cummin seeds upon the tilting of the bucket.

The device works in the following way: the air jet introduced through the tube 10 drives the blade wheel 9 which transmits its motion through the worm gear 8 to the shaft, on which is mounted the worm gear 7, driving the conveyer belt 1; thus the buckets 2, disposed on the conveyer belt, pass through the layer of black cummin seeds, and are charged individually, each with a single grain, which then is tipped over into the funnel 4, from where the grain is carried away by the air-jet, flowing out through the same funnel and is quickly carried through the tubes 5 and 6 to be projected at the cheese.

The free end of the tube 6 is fixed over the place where the black cummin seed is to be introduced in the curd.

Due to the great kinetic energy with which the grains leave the tube 6 they embed in the curd to a determined depth.

The process and the device, according to the invention, present the following advantages:

- mechanization and automatization of the introduction of black cummin seeds in Telemea cheese, processed in a continuous flow; and
- maintenance of hygienic conditions in the processing of Telemea cheese.

I claim:

1. A device for introducing grains of a condiment seed into cheese, comprising a pressurized vessel having at least one tube provided with a mouth communicating with the interior of said vessel and trained at an end opposite said mouth against cheese displaceable past said tube, means for introducing compressed air into said vessel to produce an air jet in said tube directed against said cheese; conveyer means received in said vessel and adapted to take up a series of individual grains of said seed and deposit said individual grains successively in said mouth of said tube for entrainment of the individual seed grains in said jet against said cheese to penetrate same; and compressed-air operated drive means in said vessel connected to said conveyer means for displacing same.

2. The device defined in claim 1 wherein said seed grains are black cummin seeds and said cheese is Telemea cheese, said conveyer means including an endless belt extending from a location in said vessel below said mouth to a location above said mouth and provided with a series of buckets each of a volume substantially equal to the volume of one of said seeds for individually taking up said seeds and depositing them in said mouth of said tube, said mouth of said tube being formed as a funnel diverging in the direction of said belt, said drive means including a worm gear coupled with said belt, a worm meshing with said worm gear, a further worm gear spaced from said belt and connected with said worm for rotating same, a further worm meshing with said further worm gear, a pedal wheel, coupled with said further worm, and nozzle means for directing a jet of compressed air against said pedal wheel.

3. The device defined in claim 2 wherein said vessel has transparent walls and said tube is generally upright and mounted in a bottom portion of said vessel, said tube being rigid and provided with a flexible tubular extension externally of said vessel, said belt being inclined to the horizontal and vertical upwardly from the bottom of said vessel to a location above said funnel, said device further comprising a brush at the bottom of said vessel cooperating with said belt for preventing access of said seeds to portions of said belt except for said buckets, removable closure means on the upper part of said vessel for introducing said seeds into the interior thereof, safety-valve means on the upper part of said vessel for relieving pressure thereon beyond a predetermined level, a compressed-air duct leading into said vessel and provided with a control valve for regulating the flow of air through said tube, and a further valve connected with said nozzle for regulating the air flow through the latter.